(12) United States Patent
Nevinsky et al.

(10) Patent No.: US 12,344,461 B2
(45) Date of Patent: Jul. 1, 2025

(54) SELF-FOLDING BLADDER

(71) Applicant: The Boeing Company, Chicago, IL (US)

(72) Inventors: Michael D. Nevinsky, Ridley Park, PA (US); David T. Misciagna, Ridley Park, PA (US)

(73) Assignee: The Boeing Company, Arlington, VA (US)

( * ) Notice: Subject to any disclaimer, the term of this patent is extended or adjusted under 35 U.S.C. 154(b) by 344 days.

(21) Appl. No.: 17/672,497

(22) Filed: Feb. 15, 2022

(65) Prior Publication Data

US 2022/0380117 A1    Dec. 1, 2022

Related U.S. Application Data

(60) Provisional application No. 63/195,683, filed on Jun. 1, 2021.

(51) Int. Cl.
| | | |
|---|---|---|
| *B65D 88/52* | (2006.01) | |
| *B60K 15/03* | (2006.01) | |
| *B64D 37/02* | (2006.01) | |
| *B64D 37/04* | (2006.01) | |
| *B64D 37/00* | (2006.01) | |

(52) U.S. Cl.
CPC ........ *B65D 88/52* (2013.01); *B60K 15/03177* (2013.01); *B64D 37/02* (2013.01); *B64D 37/04* (2013.01); *B64D 37/005* (2013.01)

(58) Field of Classification Search
CPC .............................. B65D 88/52; B64D 37/005
USPC ......................................................... 383/107
See application file for complete search history.

(56) References Cited

U.S. PATENT DOCUMENTS

| | | | | |
|---|---|---|---|---|
| 4,878,446 A | * | 11/1989 | Vermeulen | ............ B63B 35/308 |
| | | | | 114/30 |
| 5,368,395 A | * | 11/1994 | Crimmins | .......... B65D 88/1656 |
| | | | | 383/111 |
| 5,499,743 A | * | 3/1996 | Blumenkron | ...... B65D 88/1656 |
| | | | | 383/110 |
| 6,059,140 A | * | 5/2000 | Hicks | .................. B65D 81/3879 |
| | | | | 220/6 |
| 10,513,173 B1 | | 12/2019 | Misciagna | |
| 11,815,199 B2 | * | 11/2023 | Bard | ..................... B29C 48/151 |
| 2019/0015624 A1 | * | 1/2019 | Hill | .......................... E04H 4/108 |

* cited by examiner

*Primary Examiner* — Peter N Helvey
(74) *Attorney, Agent, or Firm* — Alleman Hall & Tuttle LLP

(57) ABSTRACT

A bladder. The bladder includes a bladder wall include first dimensions. The bladder also includes a first port disposed in the bladder wall. The bladder also includes knitted seams stitched into a first pattern in the bladder wall. The first pattern is configured such that when the bladder wall is subjected to a compressive force, the bladder collapses into a first pre-determined shape that has second dimensions less than the first dimensions.

20 Claims, 7 Drawing Sheets

SELF-FOLDING BLADDER

RELATED APPLICATIONS

This non-provisional patent application claims priority to U.S. provisional patent application 63/195,683, filed Jun. 1, 2021.

BACKGROUND

An issue faced by certain organizations is the storage of bladders. While a bladder is expected to take up a predetermined space when filled with a liquid or gas, in some cases the organization desires to compress the bladder when not in use for purposes of storage, transport, etc. As examples, a bladder manufacturer may desire to transport many liquid bladders to one or more customers, a military organization may desire to transport multiple fuel bladders to different locations, or the operators of a transport may expect to use space formerly occupied by a full bladder at some phase of operation of the transport when the bladder is less full.

However, the volume of an empty bladder may be as much as the volume of a full bladder. In other instances, an empty bladder still occupies an undesirable volume.

SUMMARY

The one or more embodiments provide for a bladder. The bladder includes a bladder wall having first dimensions. The bladder also includes a first port disposed in the bladder wall. The bladder also includes knitted seams stitched into a first pattern in the bladder wall. The first pattern is configured such that when the bladder wall is subjected to a compressive force, the bladder collapses into a first pre-determined shape having second dimensions less than the first dimensions.

The one or more embodiments also provide for a method of manufacturing a bladder. The method includes forming a first port disposed in a wall of a bladder. The bladder has first dimensions. The method includes stitching first knitted seams into a first pattern in the wall of the bladder. The first pattern is configured such that when the bladder wall is subjected to a compressive force, the bladder collapses into a first pre-determined shape having second dimension less than the first dimensions.

The one or more embodiments also provide for a method of using a bladder, the bladder including a bladder wall having first dimensions, a first port disposed in the bladder wall, and knitted seams stitched into a first pattern in the bladder wall. The first pattern is configured such that when the bladder wall is subjected to a compressive force, the bladder collapses into a first pre-determined shape having second dimensions less than the first dimensions. The method includes: collapsing the bladder into the first pre-determined shape by applying a vacuum to the first port; and storing, after collapsing, the bladder.

Other aspects of the one or more embodiments will be apparent from the following description and the appended claims.

DETAILED DESCRIPTION

Figure 1A:
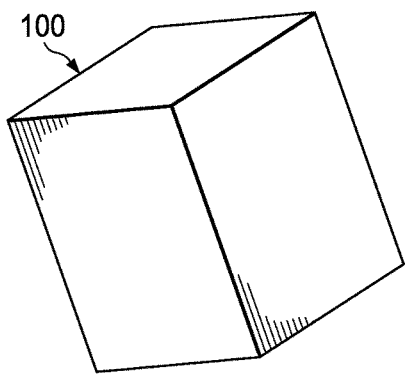
FIG. 1A, FIG. 1B, FIG. 1C, FIG. 1D, and FIG. 1E, show a self-folding bladder in use, accordance with one or more embodiments.

Specific embodiments of the one or more embodiments will now be described in detail with reference to the accompanying figures. Like elements in the various figures are denoted by like reference numerals for consistency.

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates at least two meanings. In a first meaning, unless otherwise stated, "connected to" means that component A was, at least at some point, separate from component B, but then was later joined to component B in either a fixed or a removably attached arrangement. In a second meaning, unless otherwise stated, "connected to" means that component A could have been integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process. In other words, the bottom and the wall, in being "connected to" each other, could be separate components that are brought together and joined, or may be a single piece of material that is bent at an angle so that the bottom panel and the wall panel are identifiable parts of the single piece of material.

In general, the one or more embodiments relate to self-folding objects. The term "self-folding," when applied to an object, is defined as an object that has been pre-configured to collapse into a pre-defined shape when subjected to a pre-determined type of force. The term "self-folding" does not necessarily mean that the object spontaneously folds itself, except as described further below.

The term "pre-determined type of force" refers to a force that is known to cause the object to fold along the seams. Thus, a "pre-determined type of force" could be a vacuum pressure caused by pumping air out of a bladder, a technician or machine folding the bladder along the seams, etc. Other types of force may be applied to the object or bladder, such as ballistic forces, bursting forces, or many other types, though it is expected that the bladder does not ordinarily fold under non-pre-determined forces.

The one or more embodiments relate more particularly to self-folding bladders. The term "bladder" is defined as a container, though the container need not necessarily be constructed to hold a liquid or a gas. However, the one or more embodiments are specifically contemplated with respect to bladders that hold liquids, particularly fuel bladders. However, the one or more embodiments, as indicated above, do contemplate many different types of self-folding bladders.

The one or more embodiments transform a bladder into a self-folding bladder through the use of one or more seams disposed in pre-determined locations in the bladder. The seams have stitching patterns that pre-dispose the bladder to collapse into a particular shape and set of dimensions when subjected to a particular type of force, but while maintaining a burst strength of the bladder.

Attention is now turned to the figures. FIG. 1A, FIG. 1B, FIG. 1C, FIG. 1D, and FIG. 1E, show a self-folding bladder in use, accordance with one or more embodiments. FIG. 1A through FIG. 1E should be considered together, and thus use common reference numerals.

FIG. 1A shows a bladder (100). The bladder (100) is a rectangular solid in the embodiment of FIG. 1. Thus, the seam pattern shown in FIG. 1B is particular to the rectangular solid shape of the bladder (100).

However, the bladder (100) may take on many different shapes, such as spheres, cylinders, or many other basic or complex shapes. The shape of the bladder (100) combined with the desired shape of the bladder (100) when collapsed determines the seam pattern used to achieve the desired shape of the bladder (100) when collapsed. Several examples of different bladder shapes with different seam patterns are shown in the one or more embodiments. It is expected that the examples and principles described herein allow an engineer to design a particular seam pattern for a particular bladder implementation.

Figure 1B:
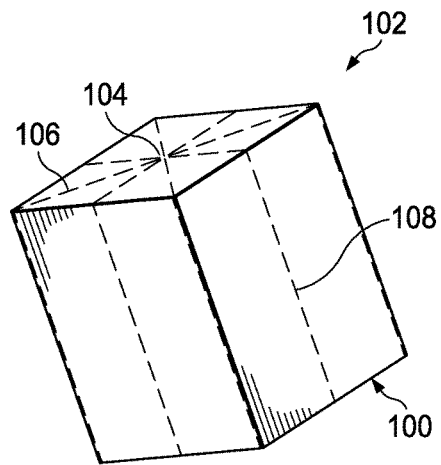

As shown in FIG. 1B, an exemplary seam pattern (102) is shown for the bladder (100). The seam pattern (102) includes seams radiating from a center point (104) on one face of the bladder (100). The seam pattern (102) radiate to corners of the one face of the bladder (100), and then lie along corners of the bladder (100), such as shown by seam (106). A corresponding seam is disposed along each of the additional faces of the bladder (100), such as shown by seam (108). A similar point and radiating pattern is disposed on the opposite face, relative to the center point (104), though is not shown in FIG. 1B.

Figure 1C:
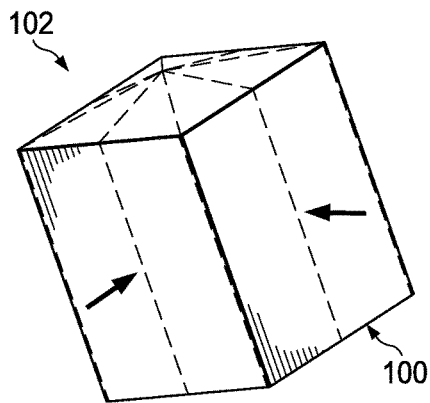

As shown in FIG. 1C, a pre-determined type of compressive force is applied to the bladder (100), in which the seam pattern (102) is shown. The compressive force may be atmospheric pressure applied when air is drawn out of the volume of the bladder (100) to form at least a partial vacuum within bladder (100). The compressive force may also be a physical folding action applied by a technician or a machine configured to fold the bladder (100).

Figure 1D:
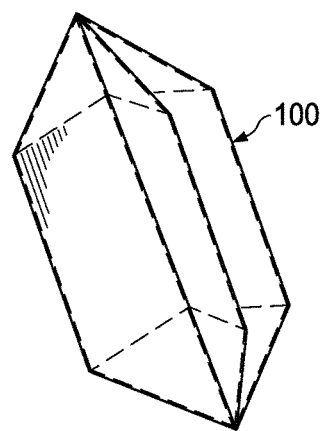
Figure 1E:
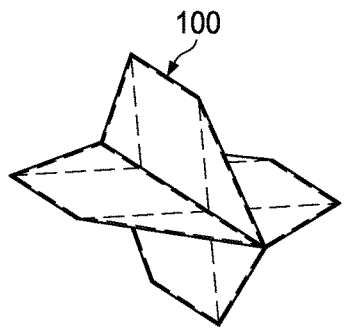

FIG. 1D and FIG. 1E show different perspectives of the bladder (100) after folding along the seam pattern (102). As can be seen in FIG. 1D and FIG. 1E, the bladder (100) has a shape that, when viewed in cross section, is in the shape of a cross.

Figure 2A:
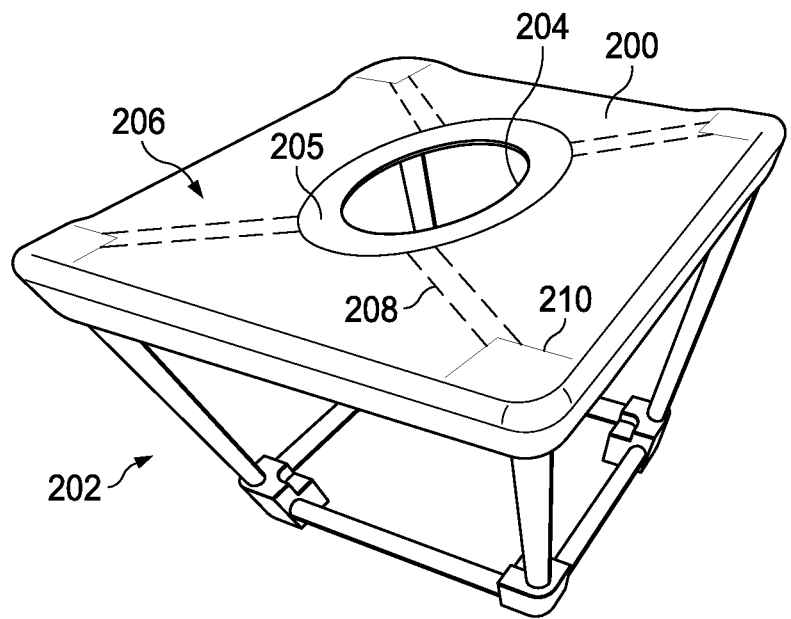
FIG. 2A, FIG. 2B, FIG. 3A, and FIG. 3B show alternative seam patterns for different self-folding bladders, accordance with one or more embodiments.

FIG. 2A, FIG. 2B, FIG. 3A, and FIG. 3B show alternative seam patterns for different self-folding bladders, accordance with one or more embodiments. As shown in FIG. 2A, one face (200) of a bladder (202) is shown for clarity. A outlet (204) is provided in the face (200) of the bladder (202). The outlet (204) is used to transfer liquid and/or gasses out of the bladder (202) during use. The outlet is defined by a reinforced region (205) where the wall of the face (200) is thicker than other portions of the wall of the bladder (202).

In FIG. 2A, the seam pattern (206) is four knitted seams, such as seam (208), that intersect corner regions, such as corner region (210), of the face (200) of the bladder (202). Thus, each seam extends from the reinforced region (205) to one of the corner regions. For example, seam (208) extends from the reinforced region (205) to the corner region (210). The seam pattern (206) shown in FIG. 2A results in the face collapsing into a flat structure with a triangular end, as opposed to the rectangular structure shown.

FIG. 2A shows another bladder (212) having a still different seam pattern (218). The seam pattern (218) includes two seams extending from the reinforced region (216) of the outlet (214), such as seam (220). The seams, including seam (220), extend at least partially down an adjacent face of the bladder (212). The seam pattern shown in FIG. 2A will cause the bladder (212) to fold flat when subjected to a pre-determined type of compressive force.

Figure 3A:
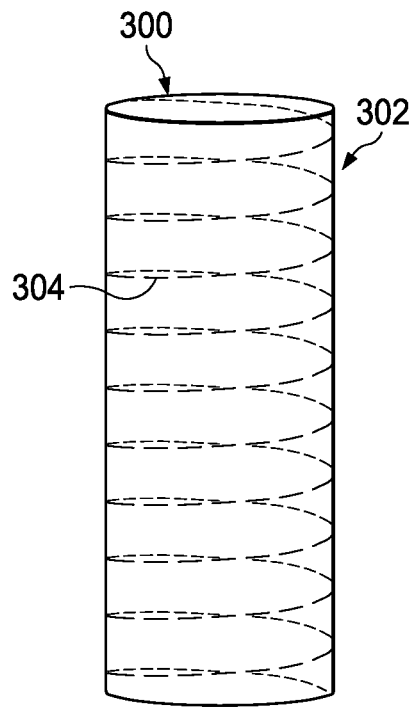
Figure 3B:
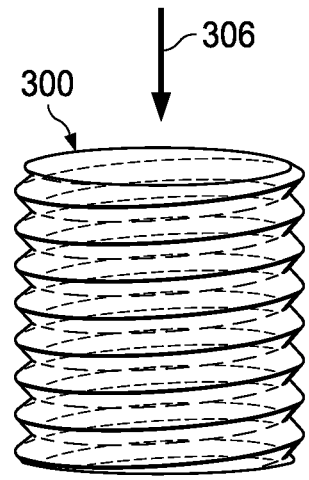

FIG. 3A shows another bladder (300). The bladder (300) has a cylindrical shape. The bladder (300) has a seam pattern (302) that is helical in shape, as shown by seam (304). Thus, as shown in FIG. 3B, when a compressive force (306) is applied to the bladder (300), the bladder (300) collapses into a cylinder of smaller height relative to an original height of the bladder (300) in an uncompressed state.

Many other seam patterns are possible, other than those shown in FIG. 1A through FIG. 3B. In general, the principle of seam design is to form seams so that the bladder will collapse into a pre-determined shape when the bladder is subjected to a pre-determined type of force. The seam pattern can be determined from the principle that the bladder will tend to fold along the seam lines.

Figure 4A:
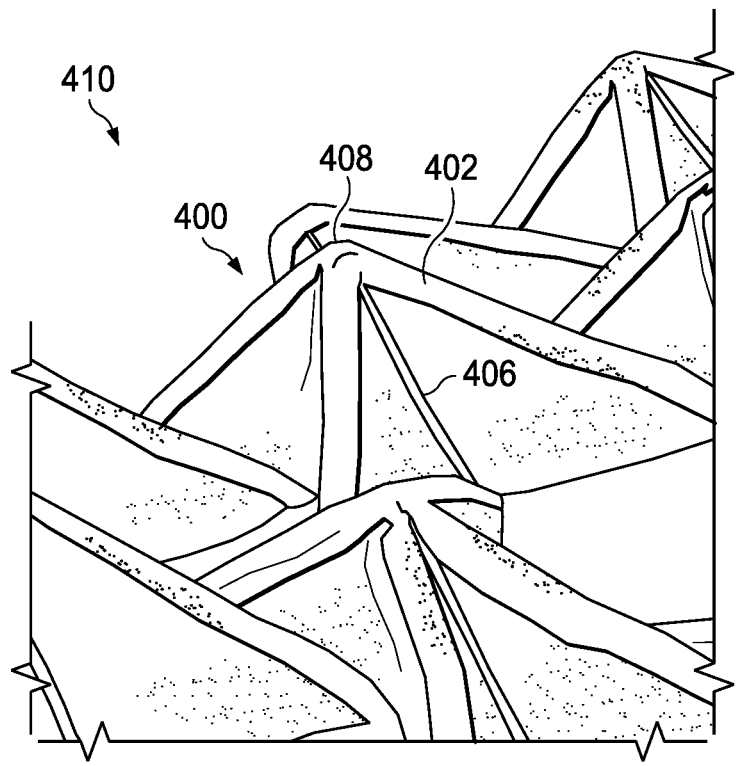
FIG. 4A and FIG. 4B show different knitting patterns for seams of a self-folding bladder, accordance with one or more embodiments.
Figure 4B:
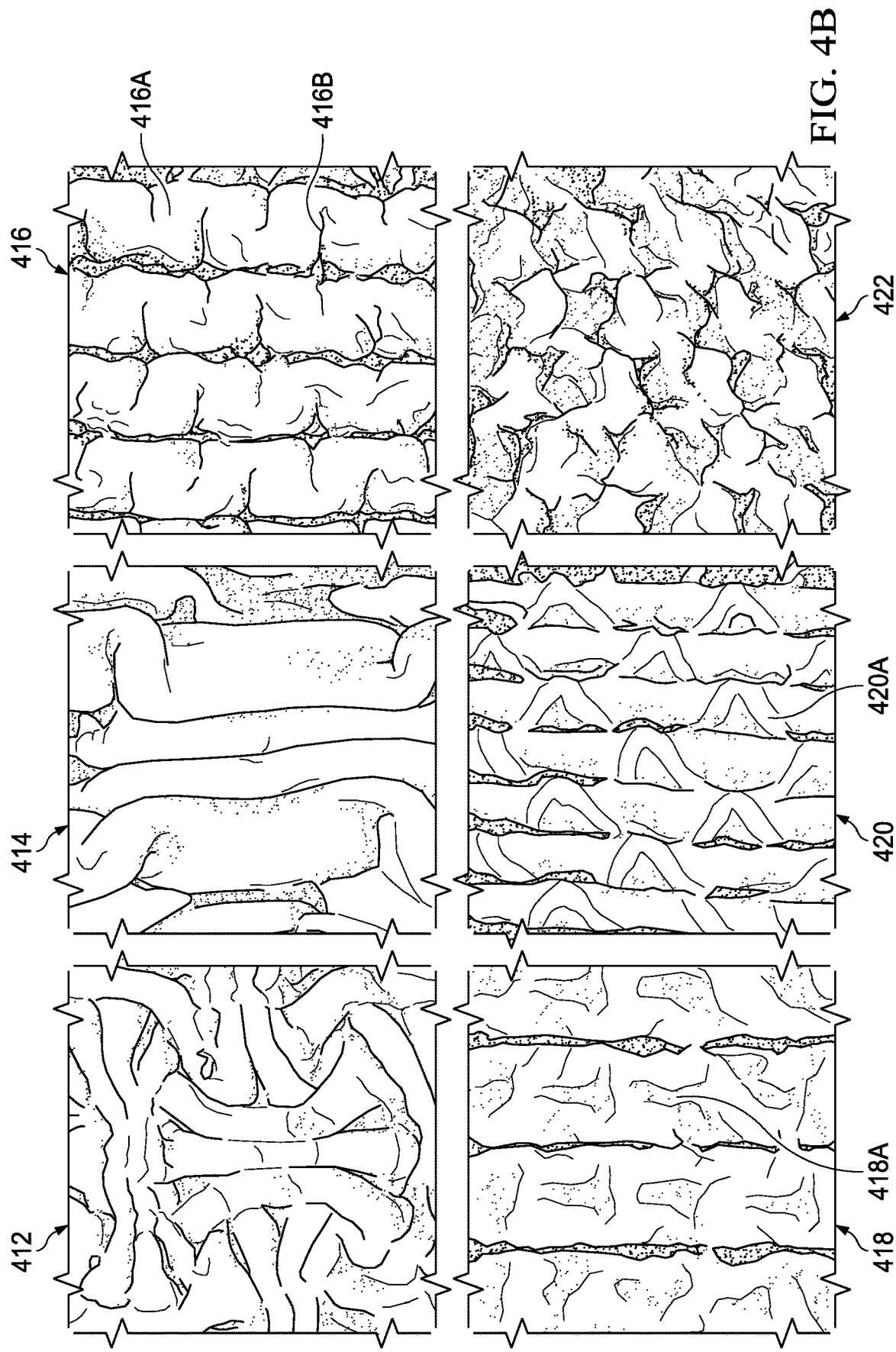

Attention is now turned to FIG. 4A and FIG. 4B, which show different knitting patterns for seams of a self-folding bladder, accordance with one or more embodiments. FIG. 4A shows a pyramid-shaped knitting pattern, as seen at pyramid (400). The stitches are disposed along edges of a given pyramid, such as at edge (402). Additionally, stitches are disposed along one or more faces of the pyramid (400), such as at stitch (406). The stitches extend from the apex (408) of the pyramid (400) to a base (not shown) of the pyramid (400). Thus, with multiple pyramids, the stitches may extend from the apexes from the bases of the pyramids.

The pyramids created by the stitches are repeated. Thus, the pyramids patterns created by the stitches form the overall knitting pattern (410) shown in FIG. 4A. The knitting pattern (410) is repeated throughout a seam, such as in any of the seams shown in FIG. 1A through FIG. 3B. The knitting pattern (410) facilitates folding of a bladder wall along a seam.

FIG. 4B shows different exemplary knitting patterns, including knitting pattern (412), knitting pattern (414), knitting pattern (416), knitting pattern (418), knitting pattern (420), and knitting pattern (422). Each different knitting pattern is repeated within a seam, such as in the seams shown in FIG. 1A through FIG. 3B.

Knitting pattern (412) is formed by using stitching patterns to form rows of stitches of pre-determined widths. The rows form a complex pattern of shapes that may be referred to as a "flower pattern."

Knitting pattern (414) is formed by using stitching patterns to form rows of stitches of pre-determined widths. The rows form a complex pattern of shapes that may be referred to as a "bracket pattern."

Knitting pattern (416) is formed by using stitching patterns to form parallel rows of stitches (416A) of pre-determined widths. The rows of stitches (416A) include alternating inserts, such as insert (416B), along the parallel rows. The alternating inserts may be characterized as pluralities of alternating inserts, as each row of inserts may be characterized as a plurality of alternating inserts, and with multiple rows there are thereby multiple pluralities of alternating inserts.

Knitting pattern (418) and knitting pattern (420) are formed by using stitching patterns to form parallel rows of stitches of pre-determined widths. The rows (418A) are of unequal widths in knitting pattern (418), as noted by the ridges shown in knitting pattern (418). The rows (420A) are of co-equal widths. However, the rows (420A) may also have different widths.

However, rows of stitches can also form complex patterns. For example, the knitting pattern (422) is formed by using stitching patterns that form rows, and the rows taken as a whole form complex patterns shown at knitting pattern (422). Thus, rows of stitches need not form straight lines within the seam.

The one or more embodiments contemplate that many different stitching patterns are possible. Thus, the one or more embodiments are not limited to the examples shown in FIG. 4A and FIG. 4B. In general, the direction and orientation of stitching patterns can be used to control the type of knitting pattern that is established.

Other modifications are possible to the bladders, seams, and knitting patterns shown in FIG. 1A through FIG. 4B. For example, the bladder walls, the seams, and/or the stitching patterns may be permeated or infused with a thermoplastic material, such as but not limited to rubber. Thus, if a ballistic force is applied to the bladder wall, to a seam, or to a stitching pattern, and the object is punctured by the ballistic force (e.g., a bullet or shrapnel), then the bladder, seam, or stitching patterns will tend to automatically seal as a result of the thermoplastic material filling the gap.

Furthermore, changing thread direction in a knit allows for shape memory. A folded knit can be unfolded and stretched to meet desired shapes in fielded use. The knit retains shape memory to fold into place for subsequent storage.

Figure 5A:
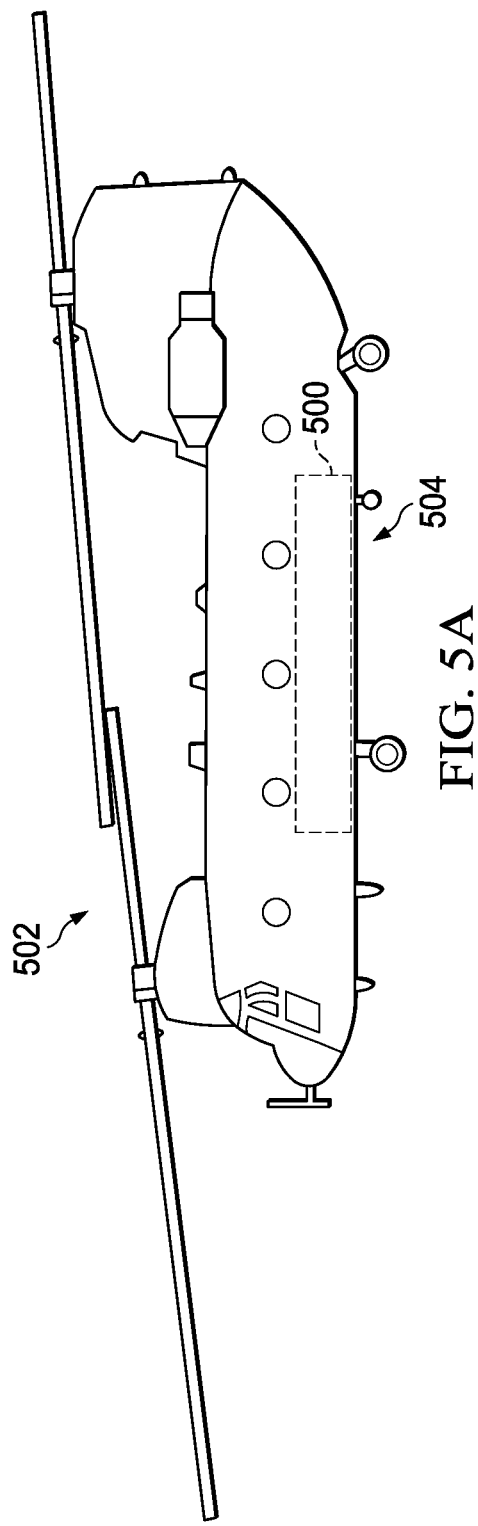
FIG. 5A and FIG. 5B show use of a self-folding bladder in a specific exemplary application, accordance with one or more embodiments.
Figure 5B:
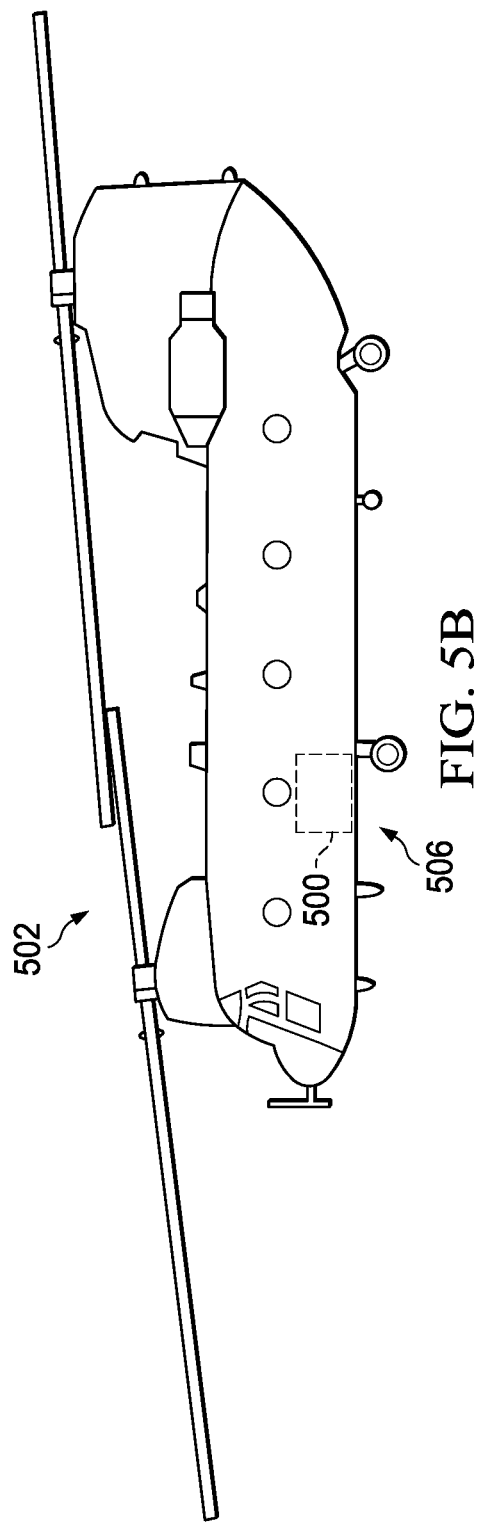

Convolutes, such as shown in FIG. 4A and FIG. 4B, may serve as a "ripstop" for the material to prevent a bladder from tearing open during ballistic impact or during a fall. In particular, in the areas of the seams, the stitching direction also forces the seams to close in towards each other after being punctured, thereby further improving the self-sealing properties of the bladder while maintaining the self-folding properties of the bladder FIG. 5A and FIG. 5B show use of a self-folding bladder in a specific exemplary application, accordance with one or more embodiments. In particular, the bladder (500) in both FIG. 5A and FIG. 5B may be any of the bladders described with respect to FIG. 1A through FIG. 4B. The bladder (500) is deployed in a helicopter (502). While the example of FIG. 5A and FIG. 5B is given in the context of the helicopter (502), the bladder of the one or more embodiments may be used in other types of aircraft, or may be used in other settings, such as other types of vehicles, in buildings, in outdoor staging areas, etc.

In the example of FIG. 5A and FIG. 5B, the bladder (500) is a fuel bladder. Fuel bladders (e.g. the bladder (500)) located inside fuel pods are used to store fuel during flight. Thus, the bladder (500) in position (504) in FIG. 5A is at a maximum volume while filled with fuel. However, as fuel is used, the bladder need not take as much space, in order to make room for other cargo taken up at a remote location before refueling. Additionally, in some cases, it may be desirable to transport multiple fuel bladders, such as to an aircraft manufacturing facility.

As shown in FIG. 5A, when not installed on an aircraft and in use, the bladder (500) is large & unwieldy. The empty bladder (500) (or when less full) is difficult to store as the bladder (500) takes up a larger volume than is required to hold fuel.

By taking advantage of the inherent shape memory benefit of self-folding knit structures, a knit bladder preform can be infiltrated with natural rubber to fabricate a bladder than can hold fuel at a large volume but also fold into a much smaller volume for storage purposes. Thus, as shown in FIG. 5B, the bladder (500) in position (506) folds into a substantially smaller volume. Thus, space within the helicopter (502) is freed up for use between fueling, or in order to transport multiple fuel bladders to different locations.

Figure 6A:
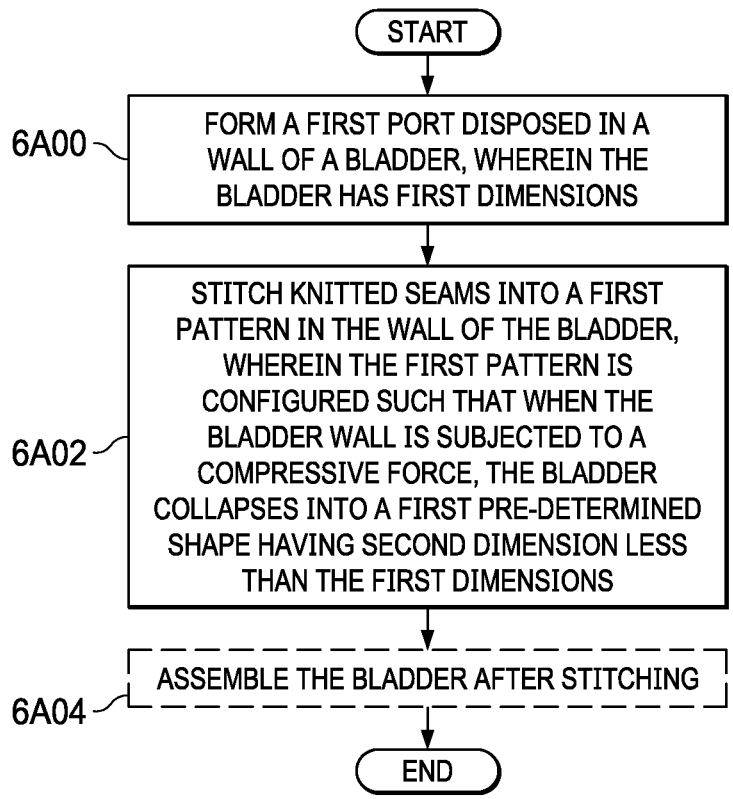
FIG. 6A is a method of manufacturing a bladder, accordance with one or more embodiments.
Figure 6B:
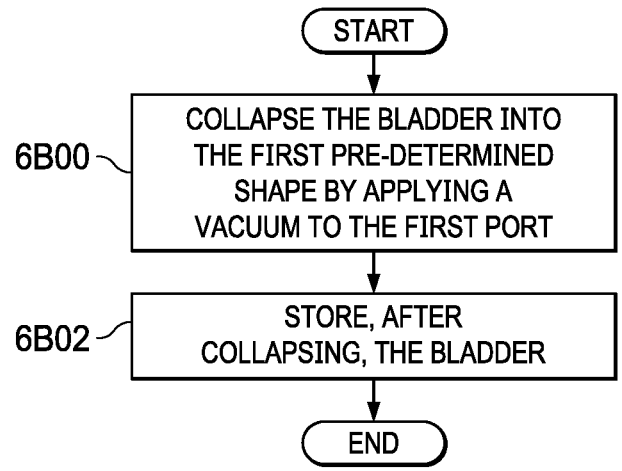
FIG. 6B is a method of using a bladder, accordance with one or more embodiments.

FIG. 6A is a method of manufacturing a bladder, accordance with one or more embodiments. FIG. 6B is a method of using a bladder, accordance with one or more embodiments. FIG. 6A and FIG. 6B should be considered together.

Figure 2B:
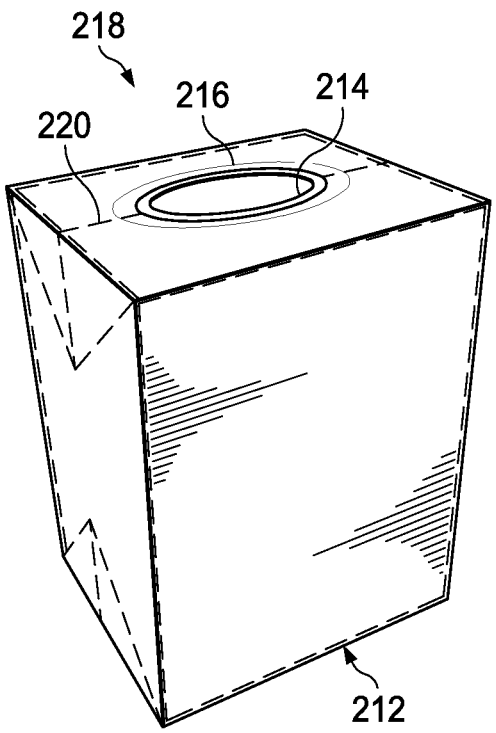

FIG. 6A may be characterized as a method of manufacturing a bladder. Step 6A00 includes forming a first port disposed in a wall of a bladder, wherein the bladder has first dimensions. The port may be formed by cutting material from the bladder and adding a reinforcement region, as shown in FIG. 2A and FIG. 2B. The port my be formed by perforation, by forming the port integrally with formation of the bladder wall, or by other means. The port may be characterized as a vacuum port when a vacuum is applied to the port, or may be characterized as a fuel port when fuel is communicated through the port. In an embodiment, a bladder may have multiple ports to accommodate both a fuel port and a vacuum port.

Step 6A02 includes stitching first knitted seams into a first pattern in the wall of the bladder, wherein the first pattern is configured such that when the bladder wall is subjected to a compressive force, the bladder collapses into a first predetermined shape having second dimension less than the first dimensions. The knitted seams may be stitched in the manner described with respect to FIG. 1A through FIG. 4B.

The method of FIG. 6A may be varied. For example, stitching at step 6A02 may be performed at least partially while the bladder is a pre-form. Thus, optionally, the method of FIG. 6A may include, at step 6A04, assembling the bladder after stitching. Step 6A04 may be performed prior to either step 6A02 or step 6A00 in other embodiments.

Still other variations are possible. For example, stitching at step 6A02 may be further varied. For example, stitching may include stitching the first pattern such that the seams radiate from a center of a first face of a rectangular block that forms the bladder to corner edges of the rectangular block and further radiates from the center of the first face to a plurality of additional faces of the rectangular block. An example of the arrangement is shown in FIG. 1B.

In another example, stitching the first pattern at step 6A02 may be performed such that the seams form a helix disposed along an outer surface of a cylinder that forms the bladder. An example of the arrangement is shown in FIG. 3A. Many other variations are possible, some of which are shown in FIG. 3A through FIG. 4B.

Attention is turned to FIG. 6B. The method of 6B may be characterized as a method of using a bladder. The bladder has a bladder wall including first dimensions, a first port disposed in the bladder wall, and first knitted seams stitched into a first pattern in the bladder wall. The first pattern is configured such that when the bladder wall is subjected to a compressive force, the bladder collapses into a first predetermined shape having second dimensions less than the first dimensions.

With respect to such a bladder, the method includes, at step 6B00, collapsing the bladder into the first pre-determined shape by applying a vacuum to the first port. Collapsing may be performed by applying a vacuum to the port, by manually folding the bladder, etc., as described above.

Thereafter, at step 6B02, the method includes storing, after collapsing, the bladder. Because the collapsed bladder has smaller dimensions than the bladder when not collapsed, the space saved can be used for other purposes in the storage area in which the bladder is stored.

While the various steps in this flowchart are presented and described sequentially, one of ordinary skill will appreciate that some or all of the steps may be executed in different orders, may be combined or omitted, and some or all of the steps may be executed in parallel. Thus, the one or more embodiments are not necessarily limited by the examples provided herein.

Figure 7:
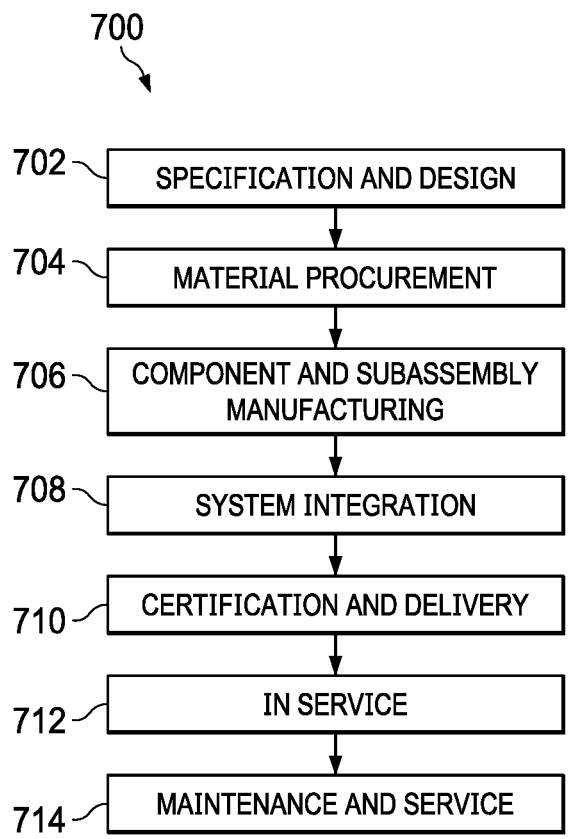
FIG. 7 shows a manufacturing method, accordance with one or more embodiments.
Figure 8:
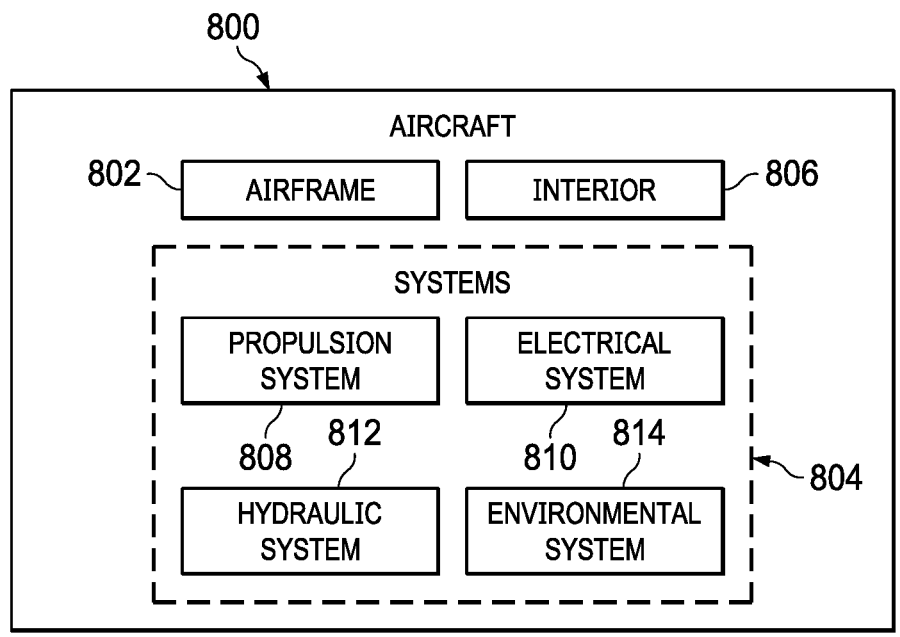
FIG. 8 shows an aircraft, accordance with one or more embodiments.

Turning to FIG. 7, during pre-production, the exemplary aircraft manufacturing and service method (700) may include a specification and design (702) of the aircraft (800) in FIG. 8 and a material procurement (704) for the aircraft (800). During production, the component and subassembly manufacturing (706) and system integration (708) of the aircraft (800) in FIG. 8 takes place. Thereafter, the aircraft (800) in FIG. 8 may go through certification and delivery (710) in order to be placed in service (712). While in service by a customer, the aircraft (800) in FIG. 8 is scheduled for routine maintenance and service (714), which may include modification, reconfiguration, refurbishment, and other maintenance or service.

Each of the processes of the aircraft manufacturing and service method (700) may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

With reference now to FIG. 8, an illustration of an aircraft (800) is depicted in which an advantageous embodiment may be implemented. In this example, the aircraft (800) is produced by the aircraft manufacturing and service method (700) in FIG. 7. The aircraft (800) may include airframe (802) with systems (804) and an interior (806). Examples of systems (804) include one or more of a propulsion system (808), an electrical system (810), a hydraulic system (812), and an environmental system (814). Any number of other systems may be included.

Although an aerospace example is shown, different advantageous embodiments may be applied to other industries, such as the automotive industry. Thus, for example, the aircraft (800) may be replaced by an automobile or other vehicle or object in one or more embodiments.

The apparatus and methods embodied herein may be employed during any one or more of the stages of the aircraft manufacturing and service method (700) in FIG. 7. For example, components or subassemblies produced in the component and subassembly manufacturing (706) in FIG. 7 may be fabricated or manufactured in a manner similar to components or subassemblies produced while the aircraft (800) is in service (712) in FIG. 7.

Also, one or more apparatus embodiments, method embodiments, or a combination thereof may be utilized during production stages, such as the component and sub-assembly manufacturing (706) and system integration (708) in FIG. 7, for example, by substantially expediting the assembly of or reducing the cost of the aircraft (800). Similarly, one or more of apparatus embodiments, method embodiments, or a combination thereof may be utilized while the aircraft (800) is in service (712) or during maintenance and service (714) in FIG. 7.

For example, one or more of the advantageous embodiments may be applied during component and subassembly manufacturing (706) to rework inconsistencies that may be found in composite structures. As yet another example, one or more advantageous embodiments may be implemented during maintenance and service (714) to remove or mitigate inconsistencies that may be identified. Thus, the one or more embodiments described with respect to FIG. 1 through FIG. 9 may be implemented during component and subassembly manufacturing (706) and/or during maintenance and service (714) to remove or mitigate inconsistencies that may be identified.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A bladder comprising:
a bladder wall comprising first dimensions;
a first port disposed in the bladder wall;
a first plurality of knitted seams stitched into a first pattern in the bladder wall, wherein the first pattern is configured such that when the bladder wall is subjected to a compressive force, the bladder collapses into a first pre-determined shape comprising second dimensions less than the first dimensions; and
a second plurality of knitted seams stitched into a second pattern in the bladder wall, wherein the second pattern is configured such that when the bladder wall is subjected to the compressive force, the bladder collapses into a combination of the first pre-determined shape and a second pre-determined shape different than the first pre-determined shape.

2. The bladder of claim 1, further comprising:
a second port disposed in the bladder wall.

3. The bladder of claim 1, further comprising:
a second port disposed in the bladder wall,
wherein the first port comprises a vacuum port, and
wherein the second port comprises a fuel port.

4. The bladder of claim 1, wherein:
the bladder comprises a rectangular block,
the first pattern comprises the first plurality of knitted seams radiating from a center of a first face of the rectangular block to corner edges of the rectangular block and from the center of the first face to a plurality of additional faces of the rectangular block, and
the first pre-determined shape comprises a collapsed cross.

5. The bladder of claim 1, wherein the bladder comprises a rectangular block, and wherein the bladder further comprises:
a second port in a first face of the rectangular block, and wherein:
the first port is a vacuum port,
the second port is a fuel port,
the first pattern comprises the first plurality of knitted seams radiating from the fuel port to corners of the rectangular block.

6. The bladder of claim 1, wherein the bladder comprises a rectangular block, and wherein the bladder further comprises:
a second port in a first face of the rectangular block, and wherein:
the first port is a vacuum port,
the second port is a fuel port,
the first pattern comprises the first plurality of knitted seams radiating from the fuel port to additional faces of the rectangular block.

7. The bladder of claim 1, wherein:
the bladder comprises a cylinder, and
the first pattern comprises the first plurality of knitted seams forming a helix disposed along an outer surface of the bladder.

8. The bladder of claim 1, wherein:
the first plurality of knitted seams comprise stitching patterns that form a plurality of pyramids.

9. The bladder of claim 1, wherein:
the first plurality of knitted seams comprise stitching patterns that form a plurality of pyramids,
edges of the plurality of pyramids are stitched with a stitching pattern,
and at least one of a plurality of faces of the plurality of pyramids are stitched from apexes of the plurality of pyramids to bases of the plurality of pyramids.

10. The bladder of claim 1, wherein:
the first plurality of knitted seams comprise stitching patterns that form a plurality of parallel rows of stitches of pre-determined widths.

11. The bladder of claim 1, wherein:
the first plurality of knitted seams comprise stitching patterns that form a plurality of parallel rows of stitches of pre-determined widths, and
the plurality of parallel rows are one of: co-equal widths and different widths.

12. The bladder of claim 1, wherein:
the first plurality of knitted seams comprise stitching patterns that form a plurality of parallel rows of stitches of pre-determined widths, and
the plurality of parallel rows comprise pluralities of alternating inserts along the plurality of parallel rows.

13. The bladder of claim 1, wherein:
the first plurality of knitted seams comprise stitching patterns that form a plurality of rows of stitches of pre-determined widths, and
the plurality of rows form a complex pattern of shapes.

14. The bladder of claim 1, wherein:
the first plurality of knitted seams comprise stitching patterns that form a plurality of rows of stitches of pre-determined widths, and
the plurality of rows form a complex pattern of shapes comprising one of: a flower pattern and a bracket pattern.

15. The bladder of claim 1, further comprising:
a thermoplastic material infused into at least one of the first plurality of knitted seams and the bladder wall.

16. A bladder comprising:
a bladder wall comprising first dimensions;
a first port disposed in the bladder wall; and
a first plurality of knitted seams stitched into a first pattern in the bladder wall, wherein the first pattern is configured such that when the bladder wall is subjected to a compressive force, the bladder collapses into a first pre-determined shape comprising second dimensions less than the first dimensions, wherein:
the first plurality of knitted seams comprise stitching patterns that form a plurality of rows of stitches of pre-determined widths; and
the plurality of rows form a complex pattern of shapes.

17. The bladder of claim 16, wherein the complex pattern of shapes comprises one of: a flower pattern and a bracket pattern.

18. A bladder comprising:
a bladder wall comprising first dimensions;
a first port disposed in the bladder wall; and
a first plurality of knitted seams stitched into a first pattern in the bladder wall, wherein the first pattern is configured such that when the bladder wall is subjected to a compressive force, the bladder collapses into a first pre-determined shape comprising second dimensions less than the first dimensions, wherein:
the first plurality of knitted seams comprise stitching patterns that form a plurality of rows of stitches of pre-determined widths; and
the plurality of rows comprise pluralities of alternating inserts along the plurality of rows.

19. The bladder of claim 18, further comprising:
a second port disposed in the bladder wall, wherein the first port comprises a vacuum port, and wherein the second port comprises a fuel port.
20. The bladder of claim 18, wherein:
the bladder comprises a rectangular block;
the first pattern comprises the first plurality of knitted seams radiating from a center of a first face of the rectangular block to corner edges of the rectangular block and from the center of the first face to a plurality of additional faces of the rectangular block; and
the first pre-determined shape comprises a collapsed cross.

\* \* \* \* \*